(12) United States Patent
Bovio et al.

(10) Patent No.: US 6,202,256 B1
(45) Date of Patent: Mar. 20, 2001

(54) HINGE SYSTEM FOR A PORTABLE COMPUTER

(75) Inventors: Michele Bovio, Boston, MA (US); Jitender Kanjiram, Nashua, NH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/148,740

(22) Filed: Sep. 4, 1998

(51) Int. Cl.[7] .................................................. E05D 5/00
(52) U.S. Cl. ............................ 16/382; 361/681; 361/683
(58) Field of Search ......................... 16/221, 223, 342, 16/382; 361/679, 681, 682, 683, 680

(56) References Cited

U.S. PATENT DOCUMENTS

| | | | | |
|---|---|---|---|---|
| 5,079,799 | * | 1/1992 | Rude et al. ........................ | 16/342 |
| 5,325,984 | * | 7/1994 | Ady et al. ........................ | 220/342 |
| 5,498,165 | * | 3/1996 | Tseng ............................... | 439/31 |
| 5,566,048 | * | 10/1996 | Esterberg et al. ............... | 361/681 |
| 5,608,604 | * | 3/1997 | Francis ............................. | 361/681 |
| 5,844,774 | * | 12/1998 | Gushiken et al. ............... | 361/681 |

\* cited by examiner

Primary Examiner—Anthony Knight
Assistant Examiner—Alison K. Pickard

(57) ABSTRACT

The hinge system for a portable computer for pivotably securing a top cover to a base unit includes a first base unit hinge member for mounting to the base unit. The first base unit hinge member has proximal and distal mounting portions which are angled relative to each other. The proximal and distal mounting portions are each securable to a surface of the base unit for distributing stress exerted on the base unit by the first base unit hinge member. A first pivoting top cover hinge assembly is secured to the first base unit hinge member. The first top cover hinge assembly mounts to the top cover.

16 Claims, 5 Drawing Sheets

HINGE SYSTEM FOR A PORTABLE COMPUTER

BACKGROUND

Portable computers such as notebook computers typically have a plastic top cover for housing and protecting a flat-panel display. In most cases, the flat-panel display is secured to the back or rear surface of the top cover. Along one edge of the top cover, the top cover is pivotably secured to a base unit with two hinges. The base unit usually has a plastic base unit housing to which the hinges are mounted and includes a keyboard on the upper surface of the base unit. The hinges allow the top cover to be opened and closed over upper surface (and hence the keyboard) of the base unit. When in the closed position, the top cover protects both the flat-panel display and the keyboard. To use the computer, the top cover is pivoted upwardly and tilted backward, relative to the base unit, to allow visual access to the flat-panel display and physical access to the keyboard.

SUMMARY OF THE INVENTION

Often, the top cover twists while pivoting. Twisting of the top cover can bind the hinges and inhibit the ability of the top cover to pivot smoothly. In addition, since the hinges are typically mounted to plastic surfaces of the base unit housing, alternating forces exerted onto those plastic surfaces by the hinges can fatigue the plastic over time and result in breakage.

The present invention is directed to a hinge system for a portable computer for pivotably securing a top cover to a base unit while preventing twisting of the top cover and breakage of the base unit housing. The hinge system includes a first base unit hinge member for mounting to the base unit. The first base unit hinge member has proximal and distal mounting portions which are angled relative to each other. The proximal and distal mounting portions are each securable to a surface of the base unit for distributing stress exerted on the base unit by the first base unit hinge member. A first pivoting top cover hinge assembly is secured to the first base unit hinge member. The first top cover hinge assembly mounts to the top cover.

In preferred embodiments, the first top cover hinge assembly includes a lower pivoting piece mounted to the first base unit hinge member. The lower pivoting piece is pivotably secured to an elongate stiffening member. The elongate stiffening member is secured to the top cover to stiffen the top cover. Specifically, the lower pivoting piece is pivotably mounted to an upper pivoting piece by a shaft. The upper pivoting piece is secured to the elongate stiffening member. The lower pivoting piece includes a tongue for insertion into a cavity within the first base unit hinge member for securing thereto. The lower pivoting piece further includes a mounting flange for securing to a top surface of the first base unit hinge member. The tongue and mounting flange are secured to the first base unit hinge member by fasteners oriented at right angles to each other.

The present invention hinge system typically includes a second base unit hinge member for mounting to the base unit spaced apart from the first base unit hinge member. The second base unit hinge member has proximal and distal mounting portions which are angled relative to each other. The proximal and distal mounting portions are each securable to a surface of the base unit for distributing stress exerted on the base unit by the second base unit hinge member. A second pivoting top cover hinge assembly is secured to the second base unit hinge member for mounting to the top cover spaced apart from the first top cover hinge assembly. The second top cover hinge assembly includes a lower pivoting piece mounted to the second base unit hinge member. The lower pivoting piece is pivotably secured to an elongate stiffening member for securing to the top cover to further stiffen the top cover. The first and second base unit hinge members are typically mounted to first and second corners of the base unit. The proximal and distal mounting portions of the base unit hinge members are preferably at right angles to each other and are secured to a bottom panel of the base unit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
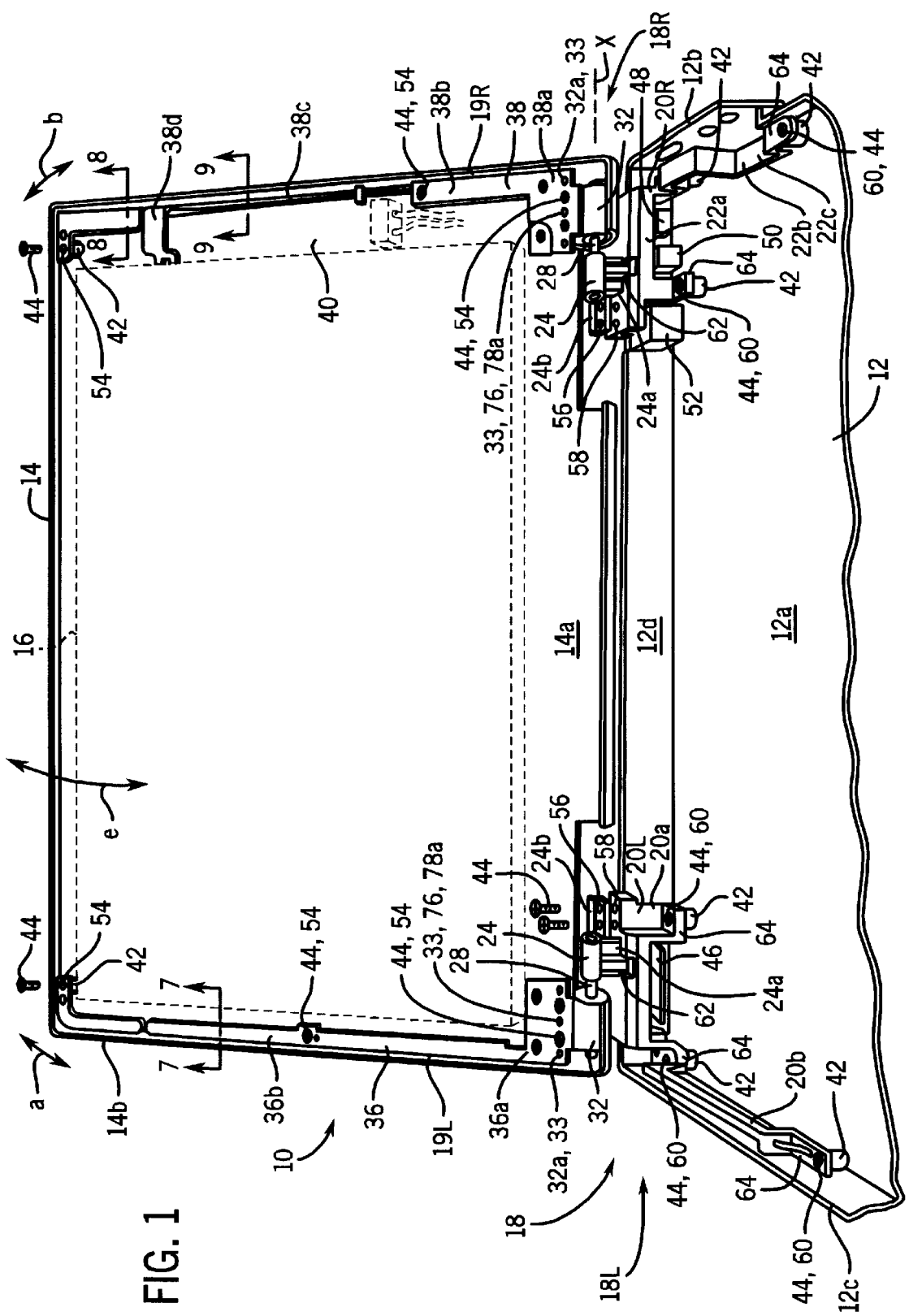
FIG. 1 is a perspective view of a portion of the base unit housing of a notebook computer pivotably secured to the top cover by the present invention hinge system.

Referring to FIG. 1, the present invention hinge system 18 pivotably secures the top cover 14 of notebook computer 10 to the base unit housing 12. Hinge system 18 consists of a left-hand hinge 18L and a right-hand hinge 18R. Left-hand hinge 18L includes a left-hand base unit hinge member 20L mounted to bottom panel 12a of base unit housing 12 at the rear left-hand corner of the base unit housing 12 and a left-hand top cover hinge assembly 19L mounted to the back panel 14a of top cover 14 at the left-hand side of top cover 14. Right-hand hinge 18R includes a right-hand base unit hinge member 20R mounted to bottom panel 12a at the rear right-hand corner of the base unit housing 12 and a right-hand top cover hinge assembly 19R mounted to panel 14a at the right-hand side of top cover 14.

Base unit hinge members 20L/20R are generally "L" shaped and are secured to bosses 42 extending from the bottom panel 12a of base unit housing 12. Left-hand base unit hinge member 20L has a leg 20a extending adjacent to the rear wall 12d of base unit housing 12 and a leg 20b extending at a right angle from leg 20a adjacent to sidewall 12c. Right-hand base unit hinge member 20R also has a leg 22a extending adjacent to the rear wall 12d and a leg 22b extending at a right angle from leg 22a adjacent to sidewall 12b. The "L" shape of base unit hinge members 20L/20R distributes stresses exerted by hinges 18L/18R over a large enough region of base unit housing 12 so that the plastic material of base unit housing 12 does not fatigue and break.

Each top cover hinge assembly 19L/19R includes a lower pivoting hinge piece 24 and an upper pivoting hinge piece 32 which are pivotably coupled together by a shaft 28. A tongue 24a extends downwardly from each lower hinge piece 24 and is coupled to a respective base unit hinge member 20L/20R within slots 62 extending through the top surface of base unit hinge members 20L/20R. A horizontal flange 24b adjacent to tongue 24a is also secured to the top surface of each base unit hinge member 20L/20R. Left-hand and right-hand top cover hinge assemblies 19L/19R include respective stiffening members 36 and 38 for stiffening top cover 14. Stiffening members 36/38 are secured to panel 14a of top cover 14 and to respective upper hinge pieces 32. Stiffening members 36/38 extend along the left and right sides of the top cover 14 which sufficiently stiffens top cover 14 to prevent twisting of the top cover 14 when pivoted.

Figure 2:
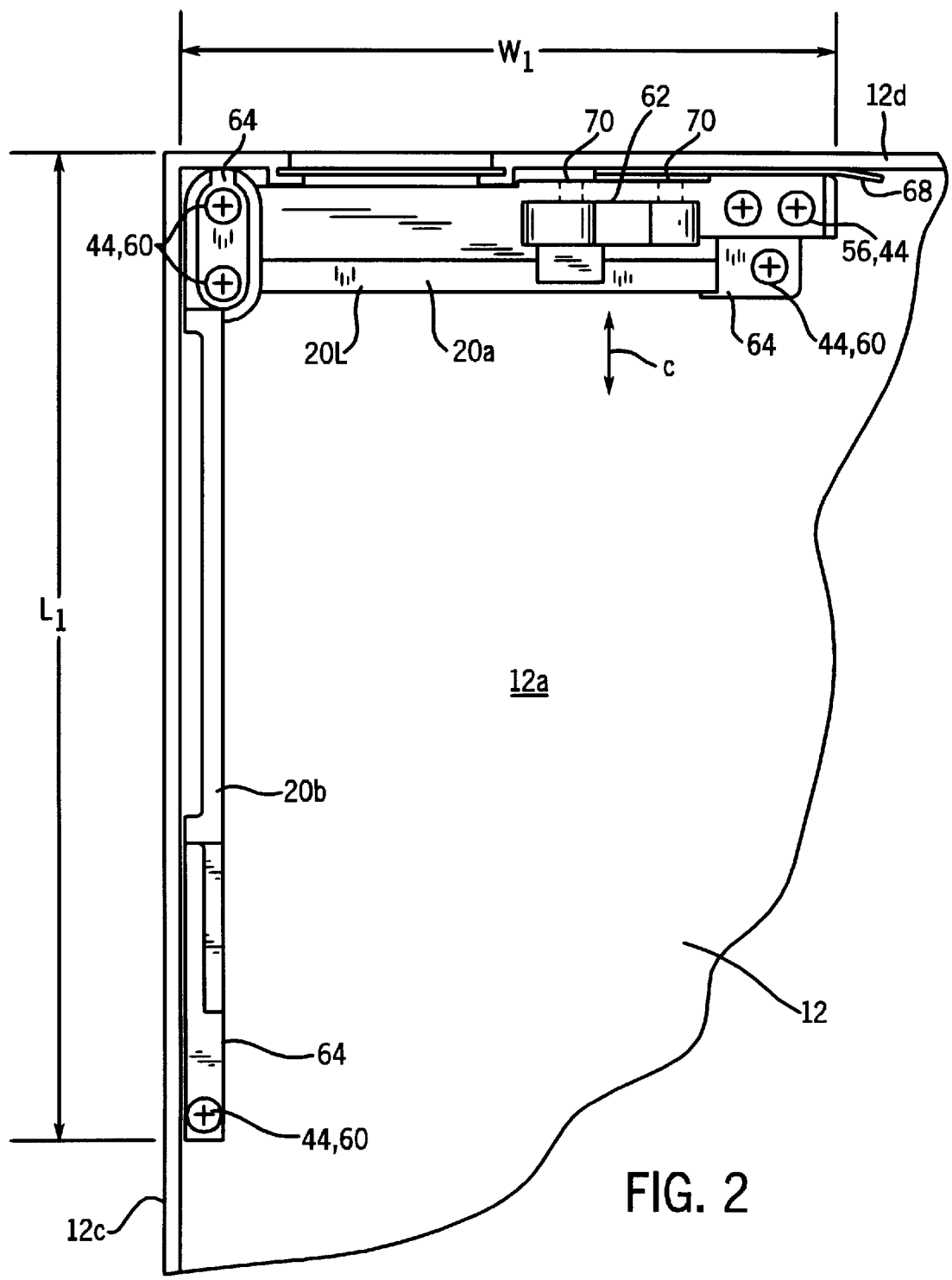
FIG. 2 is a plan view of the left-hand base unit hinge member mounted at the left-hand corner of the base unit housing.
Figure 3:
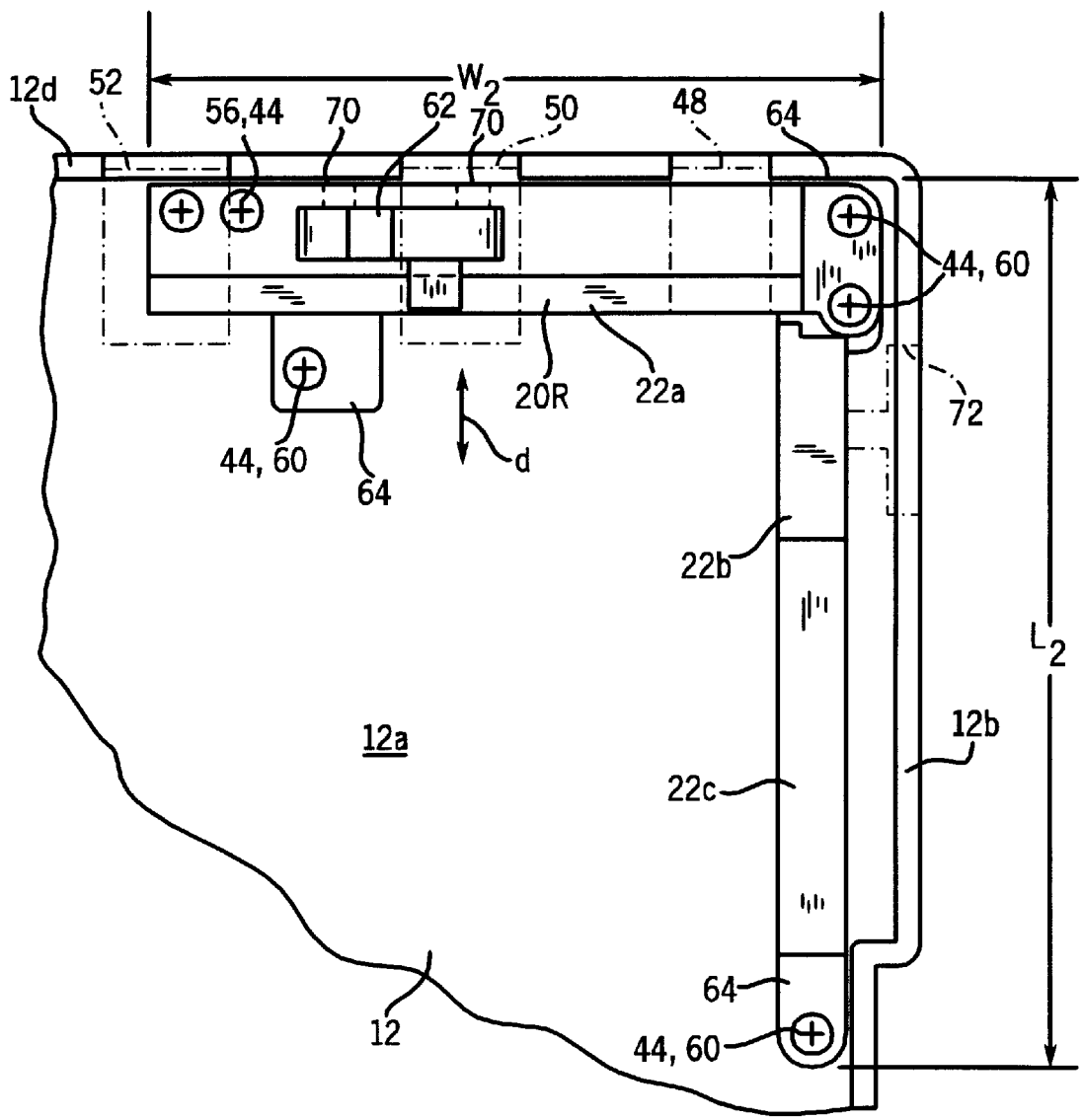
FIG. 3 is a plan view of the right-hand base unit hinge member mounted at the right-hand corner of the base unit housing.

In operation, twisting of top cover 14 (depicted by arrows a and b in FIG. 1) caused by the user pivoting top cover 14 to open or close top cover 14 in the direction of arrows e is resisted by stiffening members 36/38. The addition of stiffening members 36/38 provides top cover 14 with enough rigidity to allow top cover 14 to pivot about horizontal axis "X" and hence open and close smoothly without twisting and binding the hinge system 18. The opening and closing of top cover 14 exerts alternating forces on base unit hinge members 20L/20R in the direction of arrows c and d (FIGS. 2 and 3). These alternating forces are in turn transferred by base unit hinge members 20L/20R onto base unit housing 12. Movement of base unit hinge members 20L/20R towards the front and rear of base unit housing 12 is resisted by legs 20b/22b of base unit hinge members 20L/20R which extend in the same direction as the forces. The "L" shape of base unit hinge members 20L/20R provided by legs 20a/20b and 22a/22b distribute stresses over surfaces of bottom panel 12a, sidewalls 12b/12c and rear wall 12d adjacent to as well as between legs 20a/20b and 22a/22b. This reduces the stresses exerted on base unit housing 12 by hinge system 18 to low enough levels to prevent fatigue and breakage of base unit housing 12. The proximity of legs 20a/20b and 22a/22b to walls 12b through 12d allows the stresses to be spread over walls 12b through 12d as well as over bottom panel 12a.

A more detailed description of hinge system 18 now follows. Referring to FIGS. 1, 2 and 3, base unit hinge members 20L/20R are secured to bosses 42 extending upwardly from bottom panel 12a of base unit housing 12 with screws 44 through holes 60 in mounting flanges 64. Each base unit hinge member 20L/20R has three mounting flanges 64. Two flanges 64 are located at the far ends of legs 20a/20b and 22a/22b while the third flange 64 is located at the junction of legs 20a/20b and 22a/22b. The legs 20a/20b and 22a/22b of base unit hinge members 20L/20R each have a portion raised above flanges 64 which allows various computer components to be positioned underneath base unit hinge members 20L/20R. For example, a small circuit board 46 is shown positioned under leg 20a of base unit hinge member 20L in FIG. 1 and I/O ports 48, 50 and 52 are shown positioned under leg 22a of base unit hinge member 20R in FIGS. 1 and 3. A flex circuit 68 (FIG. 2) in electrical communication with circuit board 46 is allowed to pass between leg 20a and rear wall 12d of base unit housing 12. FIG. 3 also depicts a push button 72 extending under leg 22b of base unit hinge member 20R. In addition, legs 20a/22a extend upwardly above bottom panel 14a for securing with top cover hinge assemblies 19L/19R. A portion of leg 20b of base unit hinge member 20L abuts sidewall 12c for increased stability. A portion 22c of leg 22b extends downwardly into contact with bottom panel 12a and provides increased stability for base unit hinge member 20R since leg 22b does not abut sidewall 12b.

Figure 4:
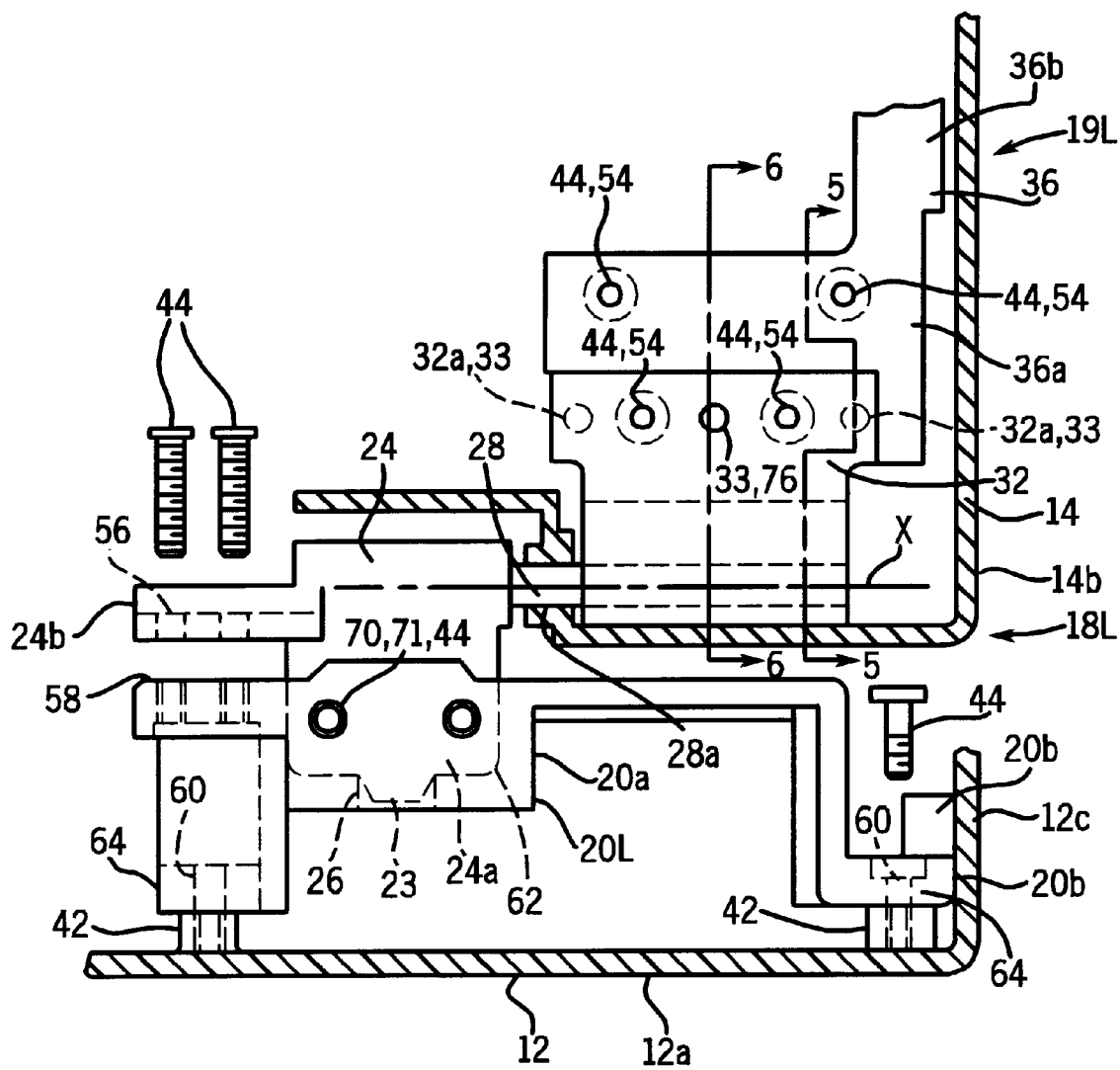
FIG. 4 is a rear view of a portion of the left-hand hinge with the base unit housing and top cover being in section.

FIG. 4 is a rear view depicting the manner in which left-hand hinge 18L is secured to base unit housing 12 and top cover 14. Right-hand hinge 18R is secured to base unit housing 12 and top cover 14 in a similar fashion such that a separate discussion directed to right-hand hinge 18R is unnecessary. Tongue 24a of lower hinge piece 24 is secured to base unit hinge member 20L within slot 62 of leg 20a with two horizontally oriented screws 44 through holes 70 and 71. Tongue 24a has a protrusion 23 which engages a small slot 26 at the bottom of slot 62. Mounting flange 24b of lower hinge piece 24 is secured to the top of leg 20a adjacent to slot 62 with two vertically oriented screws 44 through holes 56 and 58. As can be seen, holes 70/71 and 56/58 extend along axes which are perpendicular to each other. This arrangement allows base unit hinge members 20L/20R and top cover hinge assemblies 19L/19R to be first secured to the base unit housing 12 and top cover 14, respectively, and then secured together later.

Figure 5:
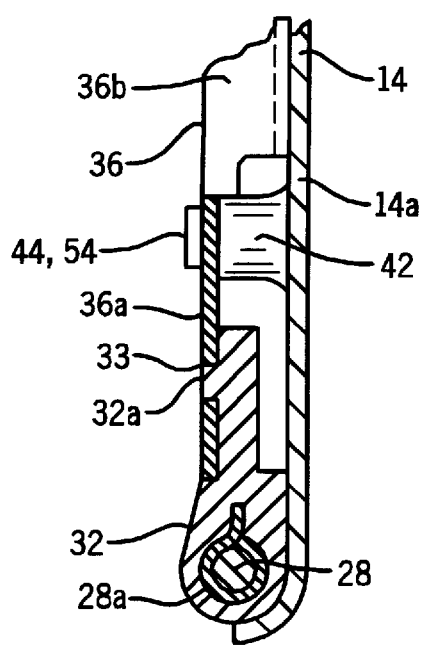
FIG. 5 is a cross-sectional view of the upper pivoting hinge piece and a portion of the stiffening member of the left-hand top cover hinge assembly mounted to the top cover taken along lines 5—5 of FIG. 4.
Figure 6:
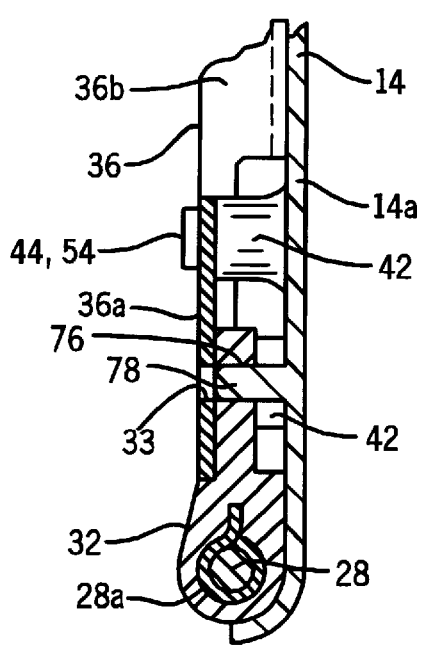
FIG. 6 is a cross-sectional view of the upper pivoting hinge piece and a portion of the stiffening member of the left-hand top cover hinge assembly mounted to the top cover taken along lines 6—6 of FIG. 4.

Lower hinge piece 24 is rotatably mounted onto shaft 28. Shaft 28 is fixed within upper hinge piece 32 by a sleeve 28a and extends from the sidewall 14a of top cover 14 through a hole 28a. Stiffening member 36 is secured to upper hinge piece 32 by screws 44 through the two lower holes 54 in the lower portion 36a of stiffening member 36. The same two screws 44 extend through upper hinge piece 32 into bosses 42 extending from panel 14a to secure upper hinge piece 32 to top cover 14. The lower portion 36a of stiffening member 36 is further secured to top cover 14 with two screws 44 extending through the two upper holes 54 of lower portion 36a into bosses 42 extending from panel 14a (FIGS. 5 and 6). The upper portion 36b of stiffening member 36 is secured to top cover 14 with screws 44 through holes 54 into bosses 42 (FIG. 1) extending from panel 14a.

The lower portion 36a of stiffening member 36 is properly positioned relative to upper hinge piece 32 by two protrusions 32a extending from upper hinge piece 32 through locating holes 33 within the lower portion 36a of stiffening member 36 (FIGS. 1, 4 and 5). Furthermore, upper hinge piece 32 is properly positioned relative to top cover 14 by a protrusion 78 extending from panel 14a through hole 76 within upper hinge piece 32 and hole 33 in lower portion 36a (FIGS. 1, 4 and 6).

Figure 7:
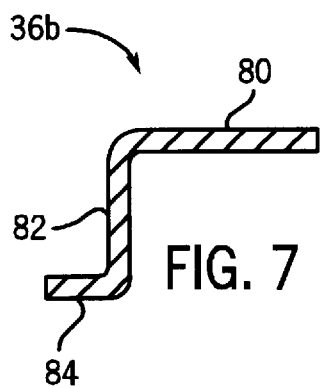
FIG. 7 is a cross-sectional view of the left-hand top cover stiffening member taken along lines 7—7 of FIG. 1.
Figure 8:
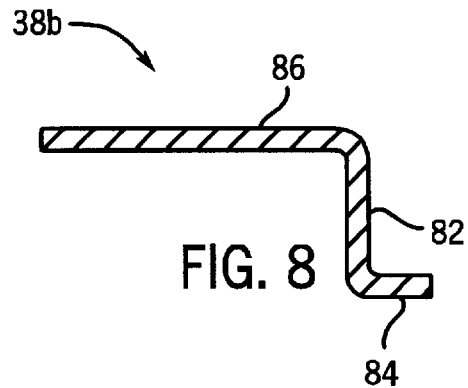
FIG. 8 is a cross-sectional view of the right-hand top cover stiffening member taken along lines 8—8 of FIG. 1.
Figure 9:
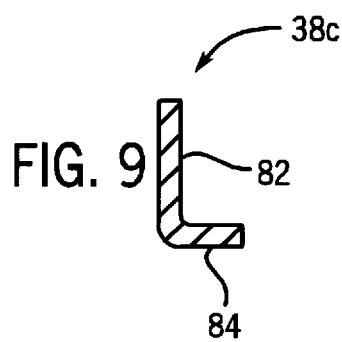
FIG. 9 is a cross-sectional view of the right-hand top cover stiffening member taken along lines 9—9 of FIG. 1.

Referring to FIGS. 7, 8 and 9, stiffening members 36 and 38 are preferably fabricated from sheet metal. The upper portion 36b (FIG. 7) of stiffening member 36 includes top 80 and side 82 walls which are bent at right angles to each other for stiffness. A lower flange 84 is bent relative to sidewall 82. Lower flange 84 contacts panel 14a of top cover 14 for providing maximum stiffness. Referring to FIG. 8, the upper portion 38b of stiffening member 38 includes a top wall 86 which is slightly wider than top wall 80 of stiffening member 36. The upper portion 38b of stiffening member 38 also includes a mid-portion 38c (FIGS. 1 and 9) which does not have a top wall 86 so that circuitry 40 can be located adjacent to mid-portion 38c. A brace 38d (FIG. 1) extends from upper portion 38b over circuitry to stabilize mid-portion 38c of stiffening member 38.

In one preferred embodiment, left-hand base unit hinge member 20L has a width $W_1$ of about 2¼ inches and a length $L_1$ of about 3¼ inches (FIG. 2). Right-hand base unit hinge member 20R has a width $W_2$ of about 2⅛ inches and a length $L_2$ of about 2⅜ inches (FIG. 3). In addition, legs 20a/22a are about ¾ of an inch in height while legs 20b/22b are about ⅜ of an inch in height. Lower hinge pieces 24 are about 1 inch long and 9/16 inches high while upper hinge pieces 32 are about ⅞ inches long and 9/16 inches high. Hinge members 20L/20R and hinge pieces 24/32 are preferably die cast from zinc or zinc alloy, but alternatively, can be made of other suitable metals.

Stiffening members 36/38 are formed from sheet metal about 0.025 inches thick and are about 9⅛ inches long. Top wall 80 of stiffening member 36 is about 0.23 inches wide and top wall 86 of stiffening member 38 is about 0.30 inches wide. Sidewalls 82 are about 0.18 inches high and flanges 84 are about 0.10 inches wide. Although particular dimensions have been discussed above, such dimensions can vary depending upon the exact dimensions of the notebook computer 10.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, the base unit hinge members 20L/20R can be secured to the walls 12b–12d of base unit housing 12. In addition, the base unit hinge members 20L/20R can be formed to more completely contact bottom panel 12a or walls 12b–12d. Furthermore, the hinge system can be made such that the base unit hinge members include pivoting hinge pieces. Finally, the stiffening members 36/38 in top cover 14 can be formed from rods, bars, tubing and the like as in the purview of one skilled in the art.

What is claimed is:

1. A portable computer comprising:
a top cover;
a base unit;
a first base unit hinge member secured to the base unit, the first base unit hinge member having proximal and distal mounting portions which are angled relative to each other, the proximal and distal mounting portions securing the first base unit hinge member to a surface of the base unit for distributing stress exerted on the base unit by the first base unit hinge member; and
a first pivoting top cover hinge assembly secured to the first base unit hinge member and to the top cover, the first pivoting top cover hinge assembly comprising a lower pivoting piece mounted to the first base unit hinge member and pivotably secured to an elongate stiffening member, the elongate stiffening member being secured to the top cover to stiffen the top cover.

2. The hinge system of claim 1 in which the lower pivoting piece includes a tongue for insertion into a cavity within the first base unit hinge member for securing thereto.

3. The hinge system of claim 2 in which the lower pivoting piece further includes a mounting flange for securing to a top surface of the first base unit hinge member, the tongue being secured to the first base unit hinge member by a first fastener and the mounting flange being secured to the first base unit hinge member by a second fastener, the first and second fasteners being oriented at right angles to each other.

4. The hinge system of claim 3 in which the lower pivoting piece is pivotably mounted to an upper pivoting piece by a shaft, the upper pivoting piece being secured to the elongate stiffening member.

5. The hinge system of claim 1 further comprising:
a second base unit hinge member for mounting to the base unit spaced apart from the first base unit hinge member, the second base unit hinge member having proximal and distal mounting portions which are angled relative to each other, the proximal and distal mounting portions each being securable to a surface of the base unit for distributing stress exerted on the base unit by the second base unit hinge member; and
a second pivoting top cover hinge assembly secured to the second base unit hinge member, the second top cover hinge assembly for mounting to the top cover spaced apart from the first top cover hinge assembly, the second top cover hinge assembly comprising a lower pivoting piece mounted to the second base unit hinge member and pivotably secured to an elongate stiffening member, the elongate stiffening member being secured to the top cover to further stiffen the top cover.

6. The hinge system of claim 5 in which the first and second base unit hinge members are mounted at first and second corners of the base unit.

7. The hinge system of claim 1 in which the proximal and distal mounting portions are at right angles to each other.

8. The hinge system of claim 7 in which the proximal and distal mounting portions of the base unit hinge members are secured to a bottom panel of the base unit.

9. A hinge system for a portable computer for pivotably securing a top cover having a length and width to a base unit comprising:
a first base unit hinge member secured to the base unit; and
a first pivoting top cover hinge assembly secured to the top cover and to the first base unit hinge member and comprising:
a lower piece, secured to the first base unit hinge member, the lower piece comprising a tongue for insertion into a cavity within the first base unit hinge member and a mounting flange for securing to a top surface of the first base unit hinge member, the tongue being secured to the first base unit hinge member by a first fastener and the mounting flange being secured to the first base unit hinge member by a second fastener, the first and second fasteners being oriented at right angles to each other; and
an elongate stiffening member, the elongate stiffening member being secured to the top cover to stiffen the top cover and pivotably secured to the lower piece, the elongate stiffening member extending along substantially all of the length of the top cover.

10. The hinge system of claim 9 comprising an upper pivoting piece, wherein the lower piece is pivotably mounted to the upper pivoting piece by a shaft, the upper pivoting piece being secured to the elongate stiffening member.

11. The hinge system of claim 9 in which the first base unit hinge member has proximal and distal mounting portions which are angled relative to each other, the proximal and distal mounting portions each being securable to a surface of the base unit for distributing stress exerted on the base unit by the first base unit hinge member.

12. The hinge system of claim 11 in which the proximal and distal mounting portions are at right angles to each other.

13. The hinge system of claim 12 in which the proximal and distal mounting portions of the base unit hinge members are secured to a bottom panel of the base.

14. A method of pivotably securing a top cover to a base unit in a portable computer comprising the steps of:

mounting a first base unit hinge member to the base unit, the first base unit hinge member having proximal and distal mounting portions which are angled substantially at a right angle relative to each other and each mounting portion securing the first base unit hinge member to a surface of the base unit for distributing stress exerted on the base unit by the first base unit hinge member;

mounting a first pivoting top cover hinge assembly to the top cover, the first pivoting top cover hinge assembly being secured to the first base unit hinge member and having an elongate stiffening member extending along a side edge of the top cover; the elongate stiffening member being secured to the top cover to stiffen the top cover;

providing the first pivoting top cover hinge assembly with a lower pivoting piece mounted to the first base unit hinge member and pivotably secured to the elongate stiffening member; and pivotably mounting the lower pivoting piece to an upper pivoting piece with a shaft, the upper pivoting piece being secured to the elongate stiffening member.

15. The method of claim 14 further comprising the steps of:

mounting a second base unit hinge member to the base unit spaced apart from the first base unit hinge member, the second base unit hinge member having proximal and distal mounting portions which are angled relative to each other, the proximal and distal mounting portions each being securable to a surface of the base unit for distributing stress exerted on the base unit by the second base unit hinge member; and mounting a second pivoting top cover hinge assembly to the top cover spaced apart from the first top cover hinge assembly, the second top cover hinge assembly being secured to the second base unit hinge member and comprising a lower pivoting piece mounted to the second base unit hinge member and pivotably secured to an elongate stiffening member, the elongate stiffening member being secured to the top cover to stiffen the top cover.

16. The method of claim 15 in which the step of mounting the first and second base unit hinge members further comprises mounting the base unit hinge members at first and second corners of the base unit.

* * * * *